United States Patent
Auslander

Patent Number: 5,995,100
Date of Patent: *Nov. 30, 1999

[54] METHOD OF AUTOMATICALLY GENERATING CUSTOM CONTROLS FOR SELECTED MODULES IN A LIBRARY

[75] Inventor: James Tobias Auslander, Irmo, S.C.

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/779,637

[22] Filed: Jan. 7, 1997

[51] Int. Cl.[6] ................................................ G06F 11/00
[52] U.S. Cl. .......................... 345/335; 345/333; 395/701
[58] Field of Search .................................. 345/333, 335, 345/326, 339, 701, 702, 703; 395/701, 703

[56] References Cited

U.S. PATENT DOCUMENTS

| | | | |
|---|---|---|---|
| 5,481,712 | 1/1996 | Silver et al. | 395/700 |
| 5,600,778 | 2/1997 | Swanson et al. | 345/333 |
| 5,603,034 | 2/1997 | Swanson | 345/701 |
| 5,634,114 | 5/1997 | Chipley | 345/701 |

*Primary Examiner*—Raymond J. Bayerl
*Assistant Examiner*—Cao H. Nguyen
*Attorney, Agent, or Firm*—Gates & Cooper

[57] ABSTRACT

A Custom Control Generator automatically generates custom controls for selected modules (i.e., externally-accessible functions or procedures) in a dynamic link library (DLL). The Custom Control Generator accepts as input the library itself, header files for the library, and a specified calling sequence of selected modules within the library. The Custom Control Generator then generates as output a shell program, wherein the shell program comprises source code for a user-interface for invoking the selected module in an interactive manner.

36 Claims, 7 Drawing Sheets

METHOD OF AUTOMATICALLY GENERATING CUSTOM CONTROLS FOR SELECTED MODULES IN A LIBRARY

BACKGROUND OF THE INVENTION

1. Field of the Invention

This invention relates in general to computer user interfaces, and in particular to a computer program for generating a custom control user interface for selected modules in an object library.

2. Description of Related Art

Component software is software that can be packaged into small, powerful, self-contained units that can be put together to build software applications. Software developers often modularize their programs by creating object libraries (known as dynamically linked libraries or DLLs in Windows™ environments). A library often contains a set of procedures or modules that perform one or more separate functions. A header file is usually associated with the library and is included in an application program so that the library's procedures are correctly invoked and passed parameters by the application program. Using such a library, the software developer can reference the module to perform the desired function instead of recreating the functionality from scratch.

In another attempt to improve the software development environment, Microsoft Corporation has developed so-called custom controls. Custom controls are self-contained modules providing elements of a user interface. Custom controls work in the same way that standard Windows™ elements such as listboxes or pushbuttons do, and appear as icons in the software development platform (such as Visual C++, Visual Basic, etc.). In the software development platform, the software developer selects the icon for the desired interface element and places it in the application program's work space. Once that is done and the application program is built, the source code for the custom control becomes a part of the source code for the application program. Any additional functionality that is specific to the application program may be added by the software developer. In this way, the software developer can focus on the requirements of his/her application program and not on the trivial aspects of the user interface.

What is needed, however, is a way to combine libraries with custom controls. A major problem with most libraries is that the modules therein usually have no built-in user interface associated with them. Therefore, there is a need in the art for a method of generating custom controls for modules in an object library.

SUMMARY OF THE INVENTION

To overcome the limitations in the prior art described above, and to overcome other limitations that will become apparent upon reading and understanding the present specification, the present invention, known as a Custom Control Generator, comprises a method, apparatus, and article of manufacture for automatically generating custom controls for selected modules (i.e., externally-accessible functions or procedures) in an object library or dynamic link library (DLL). The Custom Control Generator accepts as input the library itself and its associated header files. The Custom Control Generator then generates a shell program as output, wherein the shell program comprises source code for a user-interface for invoking the selected module in an interactive manner.

One object of the present invention is to provide an automated method for generating custom controls for selected functions or modules within libraries. Another object of the present invention is to provide some measure of user control over the automated method.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention is a Custom Control Generator that automatically generates custom controls for selected procedures or modules in a library. The Custom Control Generator accepts as input the library itself and the associated header files for the library. The library is scanned to identify the procedures therein and to associate these identified procedures with their associated procedure call and parameter definitions in the header file.

A list of these procedures are then displayed by the Custom Control Generator on a monitor for user selection. The user interface of the Custom Control Generator contains a mapping tool which also allows the user to define a calling sequence for the procedures within the library, wherein the calling sequence is illustrated as a tree structure on the monitor.

In addition, the Custom Control Generator prompts the user for information regarding the parameters or other data structures used by the selected procedure in the library. The Custom Control Generator prompts the user for information such as:

Should the parameter be part of the custom control (i.e., user interface)?

Will the data stored in this parameter need to be persistent?

Will there be a need for GET and SET methods for the parameter?

Will the parameter need to be initialized at startup?

Will the parameter be used at all?

After this information is gathered, the Custom Control Generator creates source code for a "shell program" that provides a user interface to the selected procedures in the library. This source code can be compiled into object code that operates as a standalone program, or the source code may be combined with the source code of an application program and compiled into object code that operates as the application program. Further, the user can customize the source code for the custom control by adding other functionality that is specific to their application.

Hardware Environment

Figure 1:
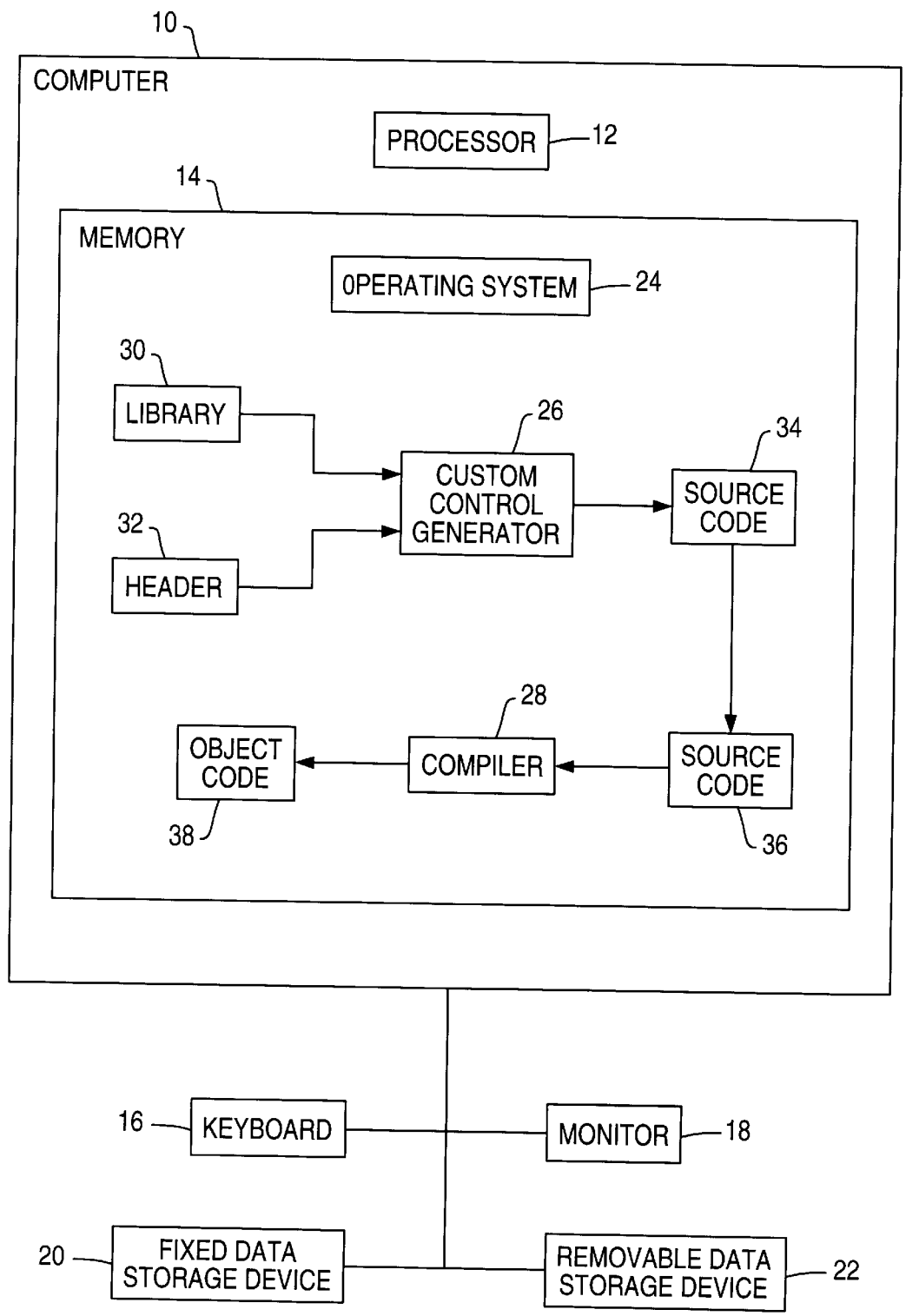
FIG. 1 is a block diagram illustrating an exemplary hardware environment used to implement an exemplary embodiment of the invention.

FIG. 1 is a block diagram illustrating an exemplary hardware environment used to implement an exemplary embodiment of the invention. The exemplary hardware environment includes a computer 10 having, inter alia, a processor 12, memory 14, keyboard 16, monitor 18, fixed data storage device 20 (e.g., hard drive), and removable data storage device 22 (e.g., CD-ROM drive). Other fixed or removable data storage devices, such as a floppy drive or tape drive, may be employed as well. Those skilled in the art will recognize that a combination of the above components and/or different components, peripherals, and other devices, may be used with the computer 10.

The computer 10 operates under the control of an operating system 24, and executes the instructions associated with a Custom Control Generator 26 and/or compiler 28 stored in the memory 14 of the computer 10. The Custom Control Generator 26 accepts as input an object library 30 and associated header file 32 for the library 32, as well as user input specifying the selection and/or calling sequence of one or more procedures within the library 30. In response, the Custom Control Generator 26 generates source 34 for the custom controls for the selected procedures in the library 30. This source code 34 may be combined with other source code 36 supplied by the user and compiled by the compiler 28 to create object code 38, or the source code 34 alone can be compiled by the compiler 28 into object code 38 that operates as a standalone program. The object code 40 then may be executed by the computer 10 to perform the user interface functions associated with the custom controls and invoke the desired procedure.

Generally, the operating system 24, Custom Control Generator 26, compiler 28, library 30, header files 32, source code 34, source code 36, and object code 38 are tangibly embodied in the memory 14 and/or one or more of the data storage devices 20–22, and/or are received from one or more of data communication devices (not shown) coupled to the computer 10. Further, the operating system 24, Custom Control Generator 26, compiler 28, and object code 38 may be loaded from the data storage devices 20–22 into the memory 14 of the computer 10 for execution by the microprocessor 12. In any embodiment, the Custom Control Generator 26 comprise instructions which, when read and executed by the microprocessor 12 of the computer 10, causes the computer 10 to perform the steps necessary to execute the steps or elements of the present invention.

Custom Control Generator Logic

Figure 2:
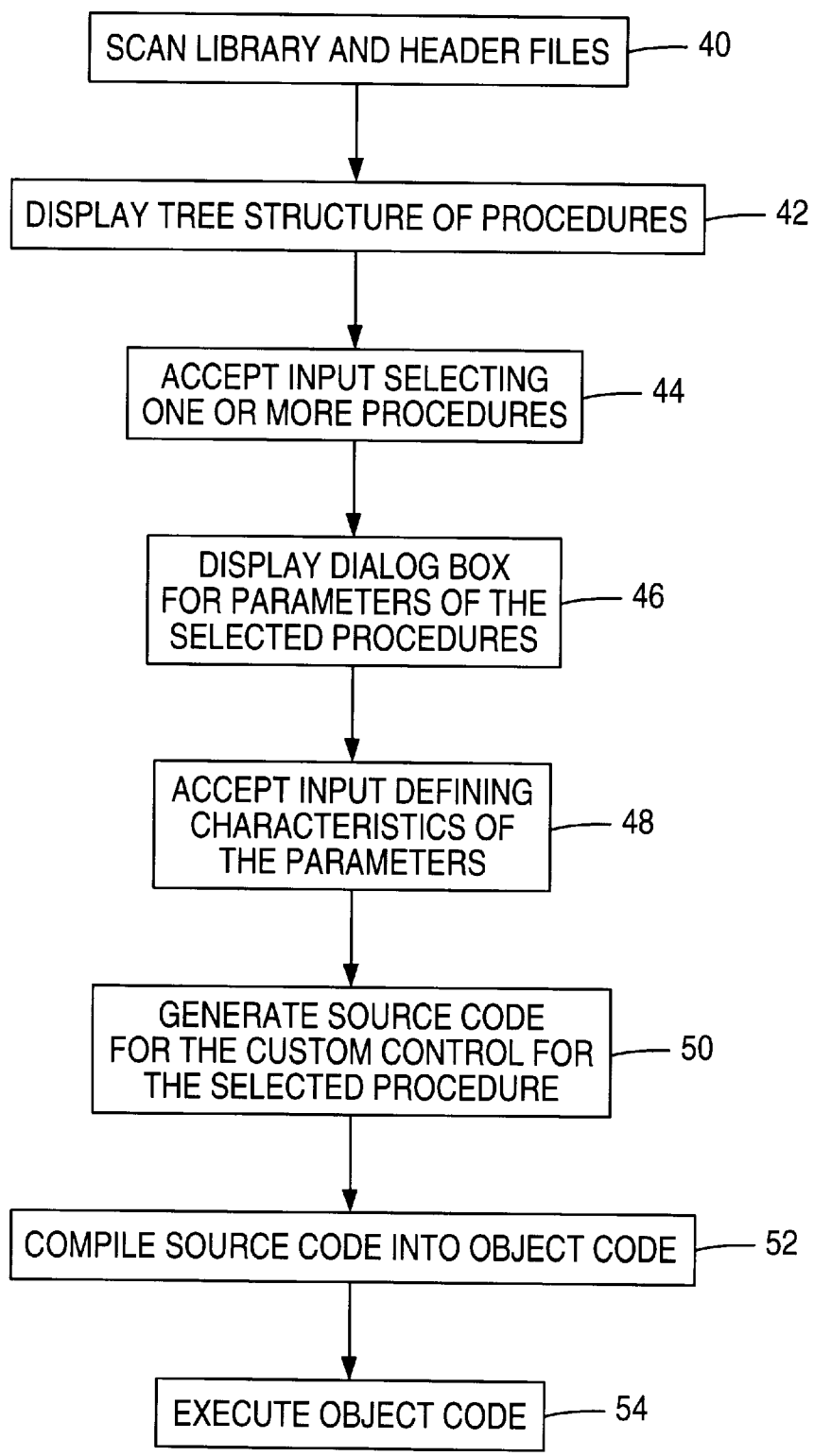
FIG. 2 is a flow diagram illustrating the general operation of Custom Control Generator according to a preferred embodiment of the present invention.

FIG. 2 is a flow diagram illustrating the general operation of Custom Control Generator 26 according to a preferred embodiment of the present invention.

Block 40 represents the Custom Control Generator 26 scanning the library 30 and the associated header file(s) 32 to identify the procedures therein.

Block 42 represents the Custom Control Generator 26 displaying a tree structure representation of the procedures on the monitor 18.

Block 44 represents the Custom Control Generator 26 accepting input from the user selecting one or more procedures or sequence of related procedures from the displayed tree structure representation.

Block 46 represents the Custom Control Generator 26 displaying a dialog box related to the parameters used by the selected procedures on the monitor 18.

Block 48 represents the Custom Control Generator 26 accepting input from the user defining the characteristics of the parameters used by the selected procedures from the displayed dialog box.

Block 50 represents the Custom Control Generator 26 generating the source code 34 for the custom controls for the selected procedure.

Block 52 represents the compiler 38 generating the object code 38 using the source code 34 (and optionally the source code 36).

Block 54 represents the computer 10 executing the object code 38.

Tree Structure Representation

Figure 3:
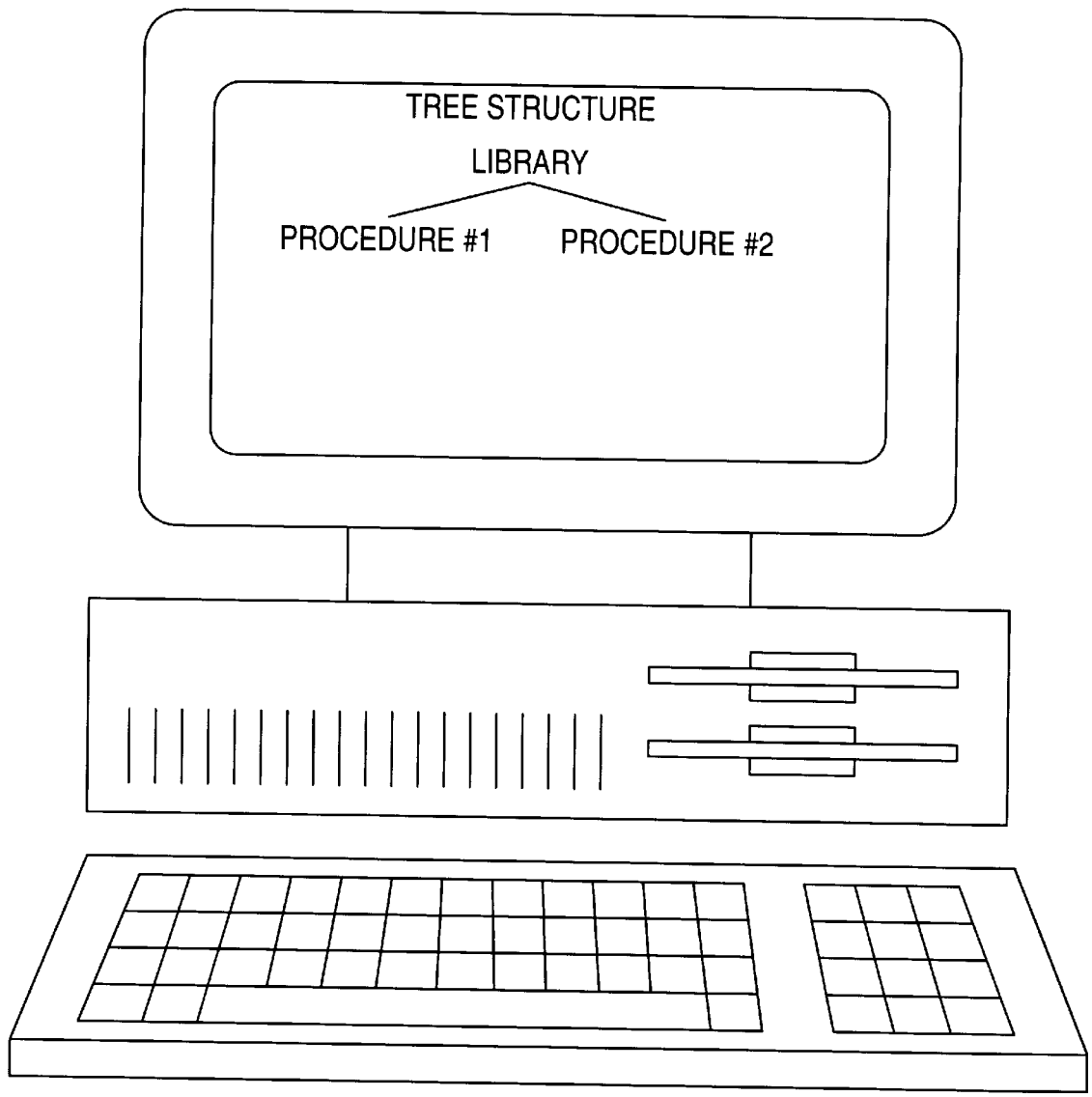
FIG. 3 is an exemplary illustration of the tree structure representation displayed by the Custom Control Generator according to the present invention.

FIG. 3 is an exemplary illustration of the tree structure representation displayed by the Custom Control Generator 26 according to the present invention. In this exemplary illustration the library "LIBRARY" has two procedures therein, i.e., PROCEDURE #1 and PROCEDURE #2. Either or both of the procedures may be selected, e.g., by clicking on the tree representation with a mouse. Moreover, if both the procedures are chosen, the tree representation represents a calling sequence, e.g., PROCEDURE #1 then PROCEDURE #2. The user may change the calling sequence by reordering the tree representation, e.g., PROCEDURE #2 then PROCEDURE #1.

Example Generation of Custom Controls

Figure 4:
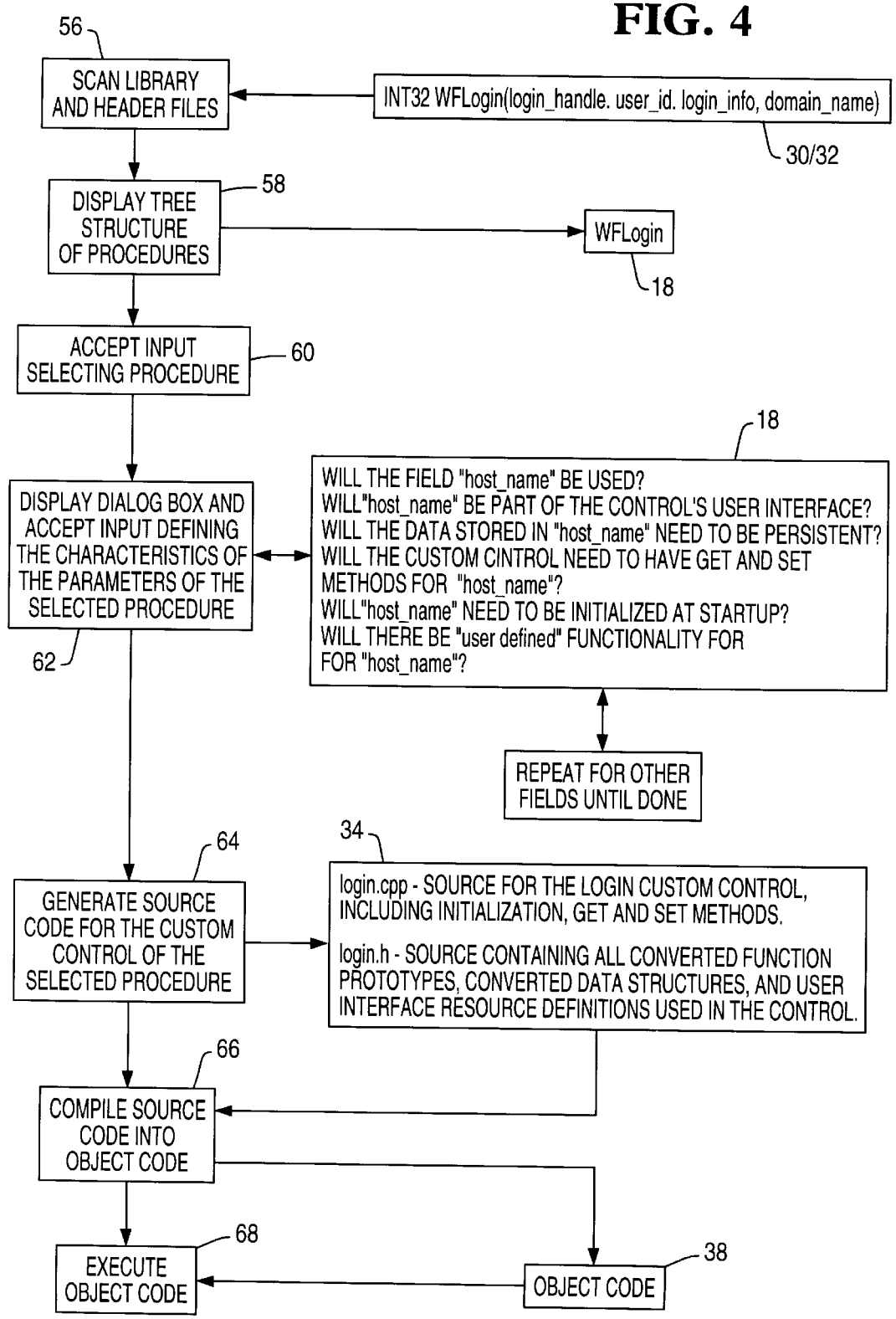
FIG. 4 is a flowchart diagram that further illustrates the operation of Custom Control Generator according to one example of the present invention.

FIG. 4 is a flowchart diagram that further illustrates the operation of Custom Control Generator 26 according to one example of the present invention.

Block 56 represents the Custom Control Generator 26 scanning a library 30 and its associated header file 32, and identifying a single procedure named "WFLogin" therein. In this example, the WFLogin procedure performs a login function for a specified domain using a name and password specified by the user.

In this example, assume that the WFLogin procedure is identified in the library 30 and header file 32 as follows:

```
INT32 WFLOGIN(LOGIN_HANDLE, USER_ID, LOGIN_
    INFO, DOMAIN_NAME)
```

The INT32 return value of the WFLogin procedure indicates the outcome of the function performed.

As indicated above, the WFLogin procedure has the parameters LOGIN_HANDLE, USER_ID, LOGIN_INFO, and DOMAIN_NAME. In this example, assume that these parameters are defined as follows:

The LOGIN_HANDLE parameter is of type PUINT32 and points to the login handle identifier returned if this call is successful.

The USER_ID parameter is of type PUINT32 and points to the user ID value returned if this call is successful.

The LOGIN_INFO parameter points to a LOGININFO structure (described below) that specifies the host, service, user and password information.

The LOGININFO structure specifies the information about where to login with the domain specified in the WFLogin procedure:

```
TYPEDEF STRUCT_LOGININFO
{
    STRUCTHEADER STRUCT_HEADER;
    CHAR HOST_NAME [HOST_NAME_LENGTH];
    CHAR SERVICE_NAME [SERVICE_NAME_LENGTH];
    CHAR LOGIN_NAME [LOGIN_NAME_LENGTH];
    CHAR PASSWORD[PASSWORD_LENGTH];
    CHAR MACH_NAME [MACH_NAME_LENGTH];
}LOGININFO;
```

The STRUCTHEADER structure is the first field of the LOGININFO structure and itself has the following structure:

```
TYPEDEF STRUCT_STRUCTHEADER
{
    INT32 TYPE;
    UINT32 LENGTH;
    UINT32 VERSION;
}STRUCTHEADER;
```

The DOMAIN_NAME parameter is of type PCHAR and points to a NULL terminated string that indicates the domain where the host and service are located, wherein the pointer is NULL if the local domain is to be used.

Block 58 represents the Custom Control Generator 26 displaying a tree structure representation of the procedures in the library 20 on the monitor 18. In this example, the tree structure is, in fact, a single node comprising the WFLogin procedure.

Block 60 also represents the Custom Control Generator 26 accepting input from the user selecting the WFLogin procedure for processing.

Figure 5:
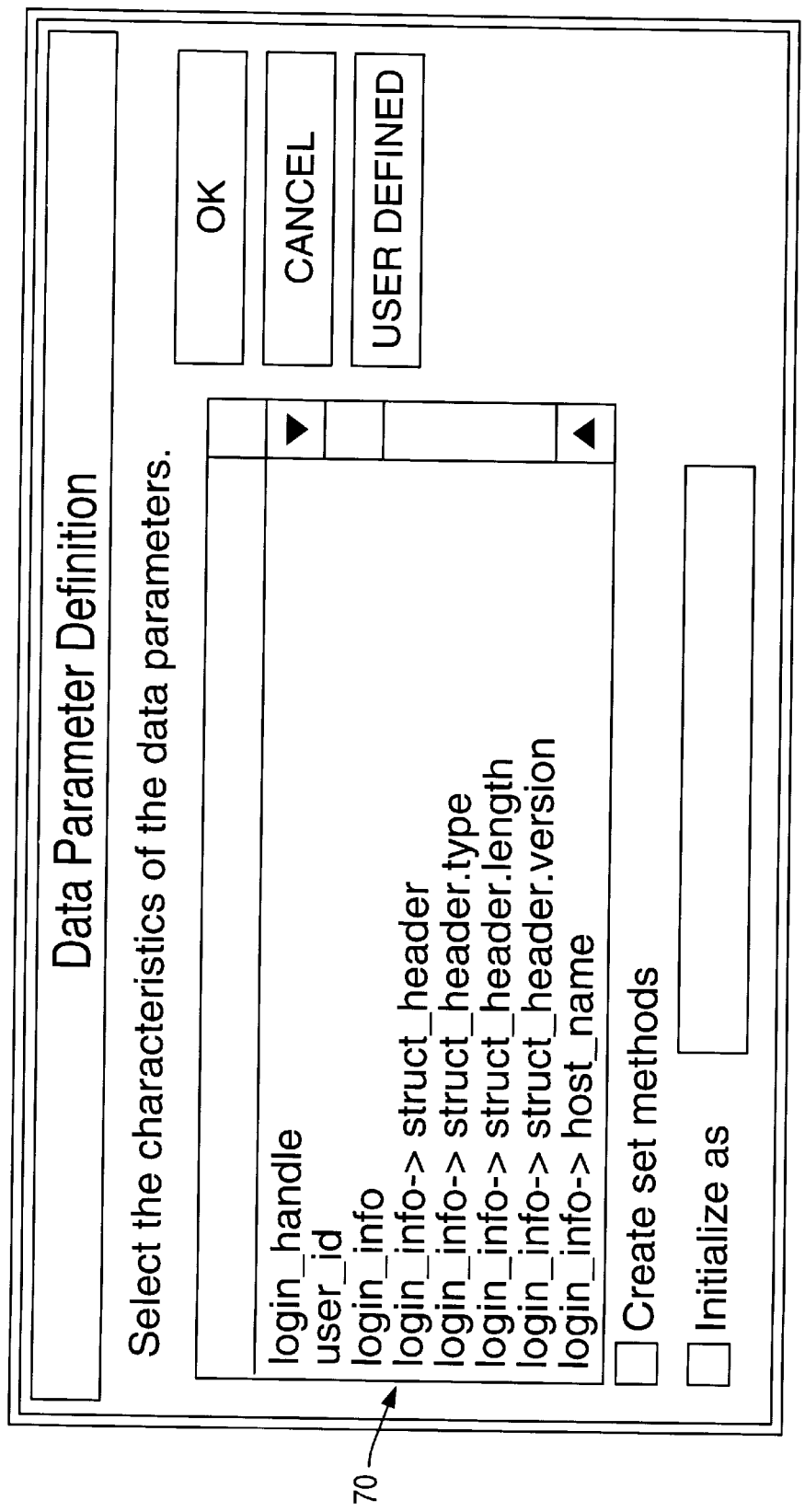
FIGS. 5 and 6 illustrate the dialog boxes displayed by the Custom Control Generator on the monitor when the Custom Control Generator prompts the user to define the characteristics of each of the parameters.
Figure 6:
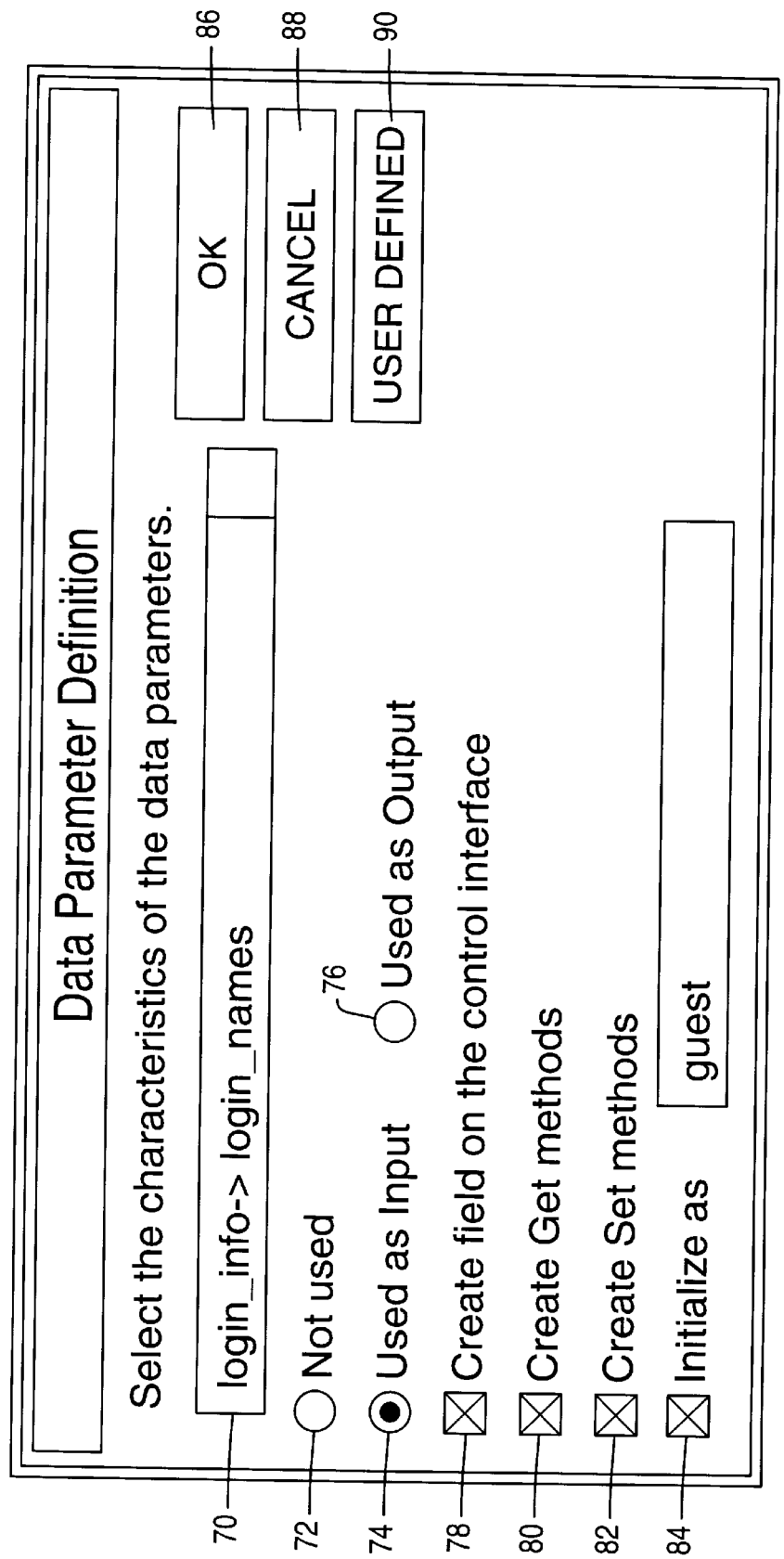

Block 62 represents the Custom Control Generator 26 displaying a dialog box related to the parameters used by the WFLogin on the monitor 18. FIGS. 5 and 6 illustrate the dialog boxes, as described in more detail below. Block 62 also represents the Custom Control Generator 26 accepting input from the user defining the characteristics of the parameters used by the WFLogin from the displayed dialog box.

For example, the user must identify whether the first field, HOST_NAME, will be used, whether it will be part of the custom control, whether the data stored in HOST_NAME needs to be persistent, whether the Custom Control Generator 26 will have to generate GET and SET methods for HOST_NAME, whether HOSTNAME will need to be initialized at startup, and whether additional user defined functionality for HOST_NAME will be provided. Further, in Block 62, the user defines the characteristics of all the other parameters used in WFLogin module.

Block 64 represents the Custom Control Generator 26 generating the source code 34 for the custom controls for the WFLogin procedure. Generally, this source code 34 will be in the C or C++ programming language, although other programming languages could be used as well.

Appendix A is an example of the source code 34, which comprises a file named "login.cpp" that contains the instructions for the WFLogin custom controls, including the initialization functions, as well as the Get and Set methods. Appendix B comprises a file named "login.h", which contains the instructions for the converted function prototypes, converted data structures, and user interface resource definitions used in the custom controls.

The example source code 34 in Appendices A and B provides a general skeleton for the present invention. Essentially the same source code 34 is generated for all procedures, except that the Custom Control Generator 26 modifies the text of the source code 34 to specifically refer to the selected procedures and their parameters.

Block 66 represents the compiler 38 generating the object code 38 using the source code 34 (and optionally the source code 36).

Block 68 represents the computer 10 executing the object code 38.

Example Dialog Boxes

FIGS. 5 and 6 illustrate the dialog boxes displayed by the Custom Control Generator 26 on the monitor 18 when the Custom Control Generator 26 prompts the user to define the characteristics of each of the parameters.

FIG. 5 illustrates how each parameter (or field of the parameter when the parameter is a structure such as LOGIN_INFO or STRUCT_HEADER) is selected from a listbox 70.

FIG. 6 further illustrates the selection of the LOGIN_NAME field of the LOGIN_INFO parameter from the listbox 70. FIG. 6 also illustrates how the user selects among radiobuttons 72, 74, and 76, checkboxes 78, 80, and 82, and enters initialization data if desired in field 84. Thereafter, for each of the parameters, one of the buttons 86, 88, or 90 is selected to indicate the user's selections.

Example Custom Control

Figure 7:
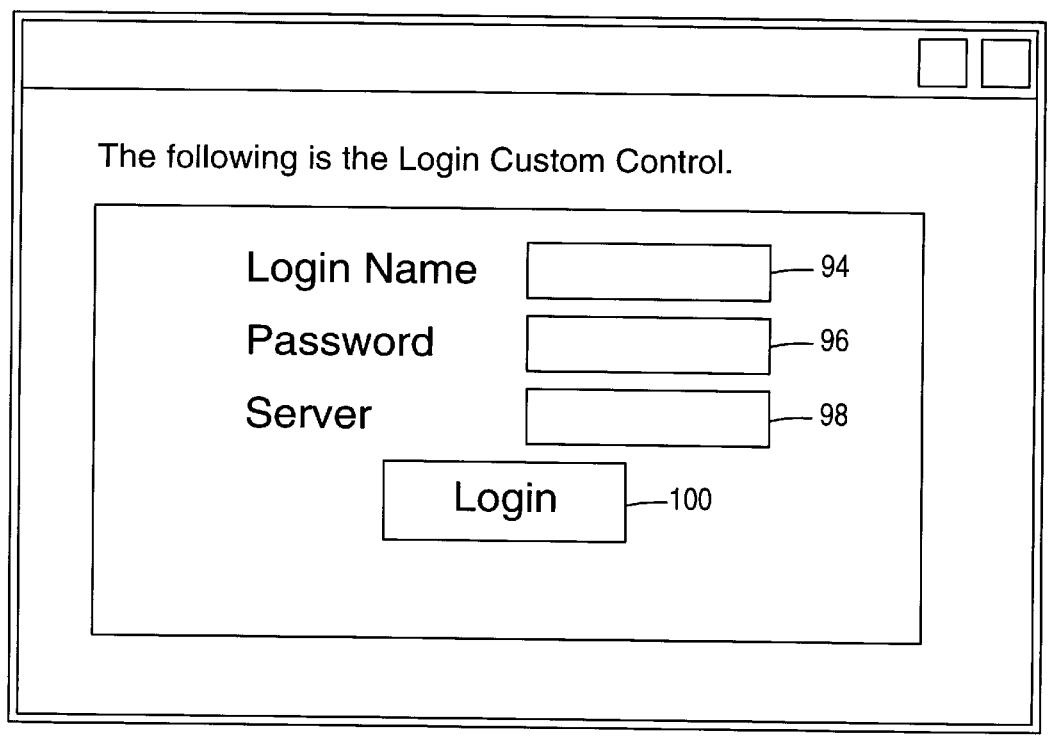
FIG. 7 illustrates the actual custom control that results from the source code generated by the Custom Control Generator.

FIG. 7 illustrates the actual custom control that results from the source code 34 generated by the Custom Control Generator 26. The custom control in this example displays a dialog box 92 comprised of three fields 94, 96, and 98, and a button labelled "Login" 100. The user enters the desired input into the fields 94, 96, and 98, and clicks or selects the Login button 100. In response, the custom control accepts the input and invokes the WFLogin function using the input.

Conclusion

In conclusion, the present invention discloses a method, apparatus, and article of manufacture for automatically generating custom controls for selected modules (i.e., externally-accessible functions or procedures) in an object library or dynamic link library (DLL). The Custom Control Generator accepts as input the library itself, header files for the library, and a specified calling sequence of selected procedures within the library. The Custom Control Generator generates as output a shell program, wherein the shell program comprises source code for a user-interface for invoking the selected procedure in an interactive manner.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of generating a custom control for a procedure within an object library stored on a computer, comprising the steps of:
   (a) scanning, in the computer, the object library and one or more associated header files for the object library;
   (b) identifying, in the computer, one or more procedures in the scanned object library;
   (c) identifying, in the computer, one or more parameters passed to the identified procedure in the scanned object library; and
   (d) generating, in the computer, source code for a shell program that displays the identified parameter on a monitor attached to a computer, accepts input from a user for the identified parameter, and invokes the identified procedure using the accepted input.

2. The method of claim 1, further comprising the steps of:
   (e) compiling, in the computer, the source code for the shell program to create an object program; and
   (f) executing, in the computer, the object program.

3. The method of claim 1, further comprising the steps of:
   (e) displaying, on the computer, a plurality of scanned procedures from the library and the associated header files for the library; and
   (f) accepting, into the computer, input from the user selecting one of the scanned procedures from a list for the subsequent identifying and generating steps.

4. The method of claim 3, further comprising the step of accepting input from the user identifying a call sequence for the scanned procedures.

5. The method of claim 1, further comprising the steps of:
   (e) displaying, on the computer, the identified parameters on a monitor attached to a computer; and
   (f) accepting, into the computer, input from the user specifying characteristics of the identified parameters.

6. The method of claim 5, wherein the generating step further comprises the step of generating the source code in accordance with the input from the user specifying characteristics of the identified parameters.

7. The method of claim 5, wherein the accepting step further comprises the step of accepting input from the user indicating whether the identified parameter will be displayed by the shell program.

8. The method of claim 5, wherein the accepting step further comprises the step of accepting input from the user indicating whether the identified parameter will require a "GET" method in the shell program.

9. The method of claim 5, wherein the accepting step further comprises the step of accepting input from the user indicating whether the identified parameter will require a "SET" method in the shell program.

10. The method of claim 5, wherein the accepting step further comprises the step of accepting input from the user indicating whether the identified parameter is a persistent parameter.

11. The method of claim 5, wherein the accepting step further comprises the step of accepting input from the user indicating whether the identified parameter has an initial value.

12. The method of claim 1, wherein the parameter is comprised of a plurality of fields.

13. A computer-implemented apparatus for generating a custom control for a function within an object library, comprising:
   (a) a computer having a data storage device coupled thereto, wherein the data storage device stores the object library;
   (b) means, performed by the computer, for scanning the object library;
   (c) means, performed by the computer, for identifying one or more functions in the scanned object library;
   (d) means, performed by the computer, for identifying one or more parameters passed to the identified function in the scanned object library; and
   (e) means, performed by the computer, for generating source code for a shell program that displays the identified parameter on a monitor attached to a computer, accepts input from a user for the identified parameter, and invokes the identified function using the accepted input.

14. The apparatus of claim 13, further comprising:
   (e) means for compiling, in the computer, the source code for the shell program to create an object program; and
   (f) means for executing, in the computer, the object program.

15. The apparatus of claim 13, further comprising:
   (e) means for displaying, on the computer, a plurality of scanned procedures from the library and the associated header files for the library; and
   (f) means for accepting, into the computer, input from the user selecting one of the scanned procedures from a list for the subsequent identifying and generating steps.

16. The apparatus of claim 15, further comprising means for accepting input from the user identifying a call sequence for the scanned procedures.

17. The apparatus of claim 13, further comprising:
   (e) means for displaying, on the computer, the identified parameters on a monitor attached to a computer; and
   (f) means for accepting, into the computer, input from the user specifying characteristics of the identified parameters.

18. The apparatus of claim 17, wherein the means for generating further comprises means for generating the source code in accordance with the input from the user specifying characteristics of the identified parameters.

19. The apparatus of claim 17, wherein the means for accepting further comprises means for accepting input from the user indicating whether the identified parameter will be displayed by the shell program.

20. The apparatus of claim 17, wherein the means for accepting further comprises means for accepting input from the user indicating whether the identified parameter will require a "GET" method in the shell program.

21. The apparatus of claim 17, wherein the means for accepting further comprises means for accepting input from the user indicating whether the identified parameter will require a "SET" method in the shell program.

22. The apparatus of claim 17, wherein the means for accepting further comprises means for accepting input from the user indicating whether the identified parameter is a persistent parameter.

23. The apparatus of claim 17, wherein the means for accepting further comprises means for accepting input from the user indicating whether the identified parameter has an initial value.

24. The apparatus of claim 13, wherein the parameter is comprised of a plurality of fields.

25. An article of manufacture comprising a computer program carrier readable by a computer, the carrier storing one or more instructions that, when executed by the computer, perform the computer-implemented method of generating a custom control for a function within an object library stored on the computer, the method comprising the steps of:

(a) scanning, in the computer, the object library;

(b) identifying, in the computer, one or more functions in the scanned object library;

(c) identifying, in the computer, one or more parameters passed to the identified function in the scanned object library; and (d) generating, in the computer, source code for a shell program that displays the identified parameter on a monitor attached to a computer, accepts input from a user for the identified parameter, and invokes the identified function using the accepted input.

26. The article of manufacture of claim 25, wherein the method further comprises the steps of:

(e) compiling, in the computer, the source code for the shell program to create an object program; and (f) executing, in the computer, the object program.

27. The article of manufacture of claim 25, wherein the method further comprises the steps of:

(e) displaying, on the computer, a plurality of scanned procedures from the library and the associated header files for the library; and (f) accepting, into the computer, input from the user selecting one of the scanned procedures from a list for the subsequent identifying and generating steps.

28. The article of manufacture of claim 27, wherein the method further comprises the step of accepting input from the user identifying a call sequence for the scanned procedures.

29. The article of manufacture of claim 25, wherein the method further comprises the steps of:

(e) displaying, on the computer, the identified parameters on a monitor attached to a computer; and (f) accepting, into the computer, input from the user specifying characteristics of the identified parameters.

30. The article of manufacture of claim 29, wherein the generating step further comprises the step of generating the source code in accordance with the input from the user specifying characteristics of the identified parameters.

31. The article of manufacture of claim 29, wherein the accepting step further comprises the step of accepting input from the user indicating whether the identified parameter will be displayed by the shell program.

32. The article of manufacture of claim 29, wherein the accepting step further comprises the step of accepting input from the user indicating whether the identified parameter will require a "GET" method in the shell program.

33. The article of manufacture of claim 29, wherein the accepting step further comprises the step of accepting input from the user indicating whether the identified parameter will require a "SET" method in the shell program.

34. The article of manufacture of claim 29, wherein the accepting step further comprises the step of accepting input from the user indicating whether the identified parameter is a persistent parameter.

35. The article of manufacture of claim 29, wherein the accepting step further comprises the step of accepting input from the user indicating whether the identified parameter has an initial value.

36. The article of manufacture of claim 25, wherein the parameter is comprised of a plurality of fields.

* * * * *